June 16, 1942.    G. A. TINNERMAN    2,286,696
CLASPING CLIP DEVICE
Filed June 13, 1941
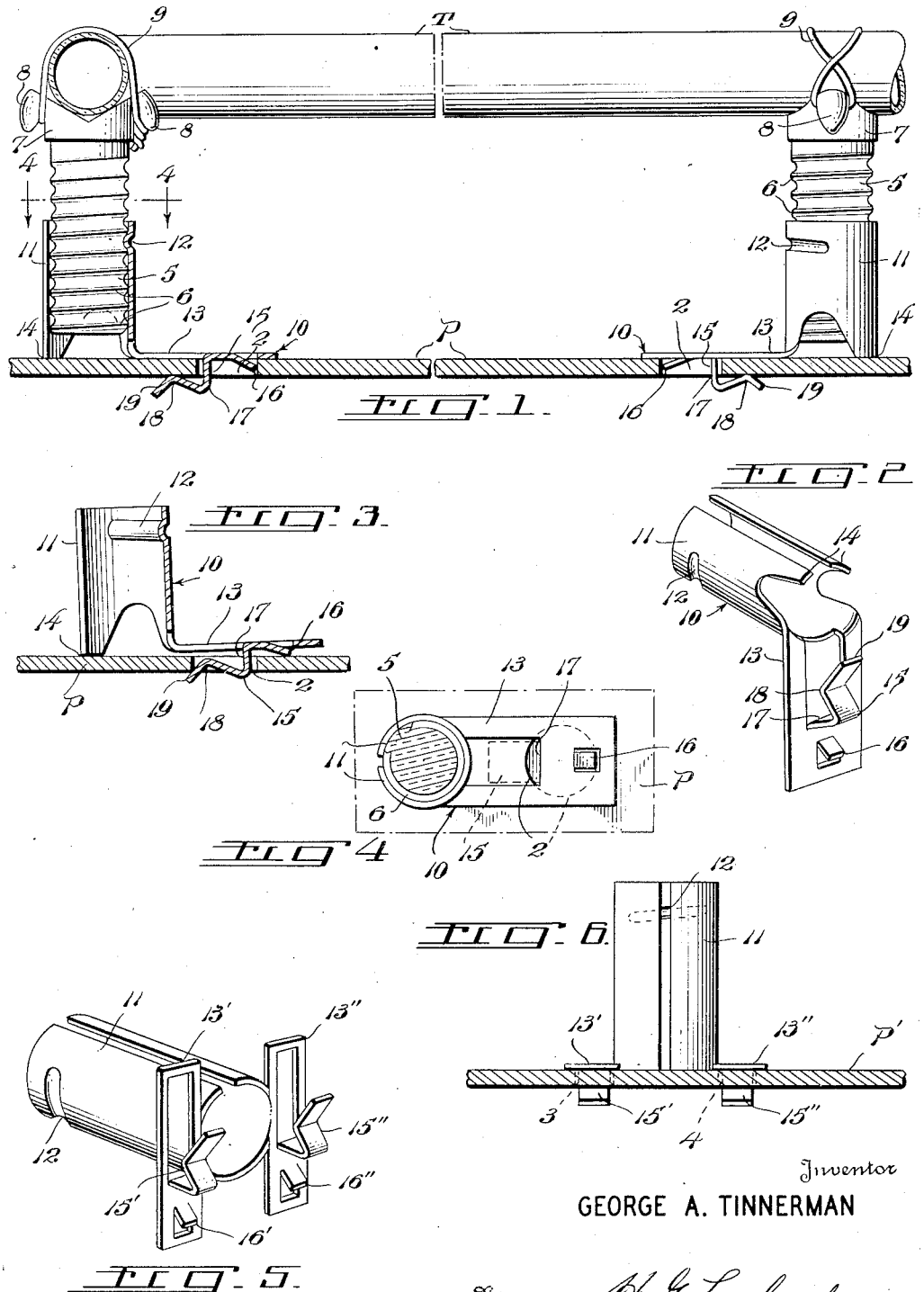
Inventor
GEORGE A. TINNERMAN
By H. G. Lombard
Attorney Patented June 16, 1942

2,286,696

UNITED STATES PATENT OFFICE 2,286,696

CLASPING CLIP DEVICE

George A. Tinnerman, Cleveland, Ohio, assignor to Tinnerman Products, Inc., Cleveland, Ohio, a corporation of Ohio Application June 13, 1941, Serial No. 397,962

3 Claims. (Cl. 248—50)

This invention relates to improvements in mounting or supporting means for luminous gaseous electric lamps, such as neon tubes, and the like, by which such tubes are mounted in an advertising sign or similar structure in spaced relation to the supporting plate or panel member serving as the background for the sign.

More particularly, the present invention is directed to a new and improved form of clip device by which the spacing posts or glass stands in such a sign structure, or the like, may be secured in adjustable position on the supporting panel member with maximum speed and facility making for important savings in time, labor and other assembly costs entering into the fabrication of any such structure.

A principal object of the invention is to provide such a mounting or supporting clip in the manner of a simple, one-piece device which is relatively cheap and inexpensive to manufacture and otherwise capable of being applied to attached position on the supporting panel in a minimum of time and effort by a simple snap fastening action which also provides a positive locked securing relation of the clip in finally applied position on the supporting panel against accidental removal or displacement.

Another object of the invention is to provide a clip device of this character which, in such positive locked attached relation on the supporting panel, is easily and quickly adjustable to any angle necessary to position the spacing post carried thereby in alignment with odd and varying shapes and curves of the tube defining the sign lettering and the like.

A further, more specific object is for the provision of such a clip device comprising a socket portion and an integral, substantial base portion laterally projecting therefrom adapted for a firm, rigid bearing engagement with the supporting panel, together with snap fastening means provided from said base portion for attaching the clip in a strong, durable and reliable manner without use whatsoever of auxiliary fastening devices such as bolts, rivets, screws, lock washers, and the like. In this respect, the invention contemplates further, a clip of this kind provided with snap fastening means adapted for an easy and quick attachment or detachment of the clip from the supporting panel by an operation taking place entirely from one surface thereof, as from the face side of the sign backboard, thereby requiring only one worker to attach the clips and eliminating any necessity for disassembly of the sign for replacement of broken tubing, or other repair purposes.

Further objects and advantages, and other new and useful features in the construction, arrangement and general combination of parts of the invention will be readily apparent to those skilled in the art as a description thereof proceeds with reference to the accompanying drawing, for purposes of illustration but not of limitation, in which like reference characters designate like parts throughout the same, and in which:

Fig. 1 is an elevational view, partly in section, showing the mounting of a tube by spacing posts secured to a panel by the improved supporting clips of the invention;

Fig. 2 is a perspective view of one of the supporting clips;

Fig. 3 is a vertical sectional view showing the initial application of a clip to attached position in an assembling opening in the panel; and Fig. 4 is a sectional view of Fig. 1 taken on line 4—4, looking in the direction of the arrows.

Fig. 5 is a perspective view of another form of clip of the invention; and,

Fig. 6 is an elevational view illustrating the clip of Fig. 5 in attached position on a panel.

Referring now, more particularly, to the drawing, Fig. 1 illustrates a general organization embodying the clip device of the present invention as designed for use in the mounting of a luminous gaseous electric lamp, such as a neon tube T, or the like, employed in advertising sign or similar structure. Such tubes are usually formed into various shapes and designs to define names, symbols and advertising matter against a backboard or panel member serving as the background of the sign. The panel, designated generally P, may be any suitable material but is usually provided as a sheet metal plate-like structure which is provided, as necessary, with spaced openings 2 in or adjacent the general path or contour defined by the shape or design of the tube T.

The tube T is mounted in spaced relation to backboard or panel P by means of spacing posts 5 formed preferably of insulating material such as glass or porcelain. A spacing post of this character is provided with a relatively coarse thread 6 formed on the shank thereof and a head 7 recessed to provide a seat for the tube between ears or lug elements 8. With the tube T seated on the recessed head 7 of a spacing post as illustrated in either showing of Fig. 1, a tie wire 9 or equivalent fastening means is bound over the tube by loops from one to the other of said ears 8 to secure the tube firmly and rigidly to the spacing post in completing the mounting thereof, as presently to be described.

The lower threaded shank portions 6 of the spacing posts are adapted to be secured to the panel member P by means of supporting clips 10 attached to the panel through the preperforated openings 2 therein. A preferred form of supporting clip, in accordance with the present invention, is best seen in Fig. 2, the same being constructed of a relatively small, inexpensive blank of any suitable sheet metal material, preferably of a spring metal nature and of a kind not subject to rust or corrosion, such as phosphor bronze or other suitable spring metal cadmium or copper plated.

The clip 10 comprises a generally tubular socket portion 11 which is preferably cylindrical and formed with a longitudinal split defined by the spaced edges thereof, such that the same is resilient and expansible as necessary to receive a spacing post inserted therein and frictionally and grippingly hold the same in assembled relation therewith. Intermediate the ends of the socket member and preferably adjacent the outer end thereof, there is provided one or more inwardly bent corrugations in the nature of a rib-like element 12 extending transversely of the socket member 11 and disposed on an inclination corresponding substantially to the thread helix 6 on the shank of the spacing post 5.

The lower end of the socket member 11, carries an integral plate-like extension 13 adjacent cutout areas defining spaced feet 14 and facilitating bending of said integral extension generally at right angles to the socket member to provide a base of sufficient size and proportions as to bear on a substantial area of the panel P and, together with said spaced feet 14, firmly and rigidly retain the socket member thereon in generally normal relation thereto.

From said plate-like base 13 of the clip, attaching means are provided and designed for substantial snap fastening action in the openings 2 in the panel and adapting the clip to be applied to attached position by an operation taking place entirely from the forward or face side of said panel member P. Thus, only one operator is needed to apply the clips of the present invention, whereas, if nut and bolts were employed, another workman would be required at the rearward side of the panel to hold the nuts as the cooperating bolts were inserted and fastened therewith.

A preferred form of such snap fastening attaching means is provided in the manner of cooperating attaching finger and locking detent elements 15, 16, respectively, both struck and formed from the base 13 of the clip device to extend from the undersurface thereof. The attaching finger 15 is preferably formed into a substantial hook defining a shoulder 17 immediately adjacent the base 13 while a free end portion thereof is bent outwardly to provide a flared lip 19 inclined toward a work engaging or bearing portion 18 of said finger. Said finger otherwise extends in somewhat parallel relation to the base 13 with the bearing portion 18 thereof spaced from said base in normal, untensioned relation a distance slightly less than the thickness of the panel member, and with the lip 19 flared outwardly therefrom to a spacing considerably greater than the thickness of said panel member to facilitate the initial application of the attaching finger to the assembling opening 2 therein, substantially as shown in Fig. 3.

The locking detent 16 may be of any suitable character and is preferably provided by a small slit portion which is pressed out of the plane of the base 13 such that the free end thereof defines a relatively sharp shoulder adapted to abut the side wall of the assembling opening 2 in positive locking relation therewith. Said detent otherwise is so designed that the engaging portion thereof is spaced from the shoulder 17 of the attaching finger a distance at least slightly less than the spacing of opposing wall portions of the assembling opening to engage an adjacent wall thereof in opposition to removal or displacement of said finger from fully attached position in said opening.

With a clip device provided in accordance with the foregoing, the attaching finger 15 is initially applied to an assembling opening 2 in the panel member substantially as shown in Fig. 3, with the flared lip 19 in position to ride over the corner edge of said opening at the rearward face of the panel. By depressing the base 13 and simultaneously sliding the same forward, the flared lip 19 engages said corner edge and automatically causes a spreading of said finger 15 away from the base 13 sufficient for the bearing portion 18 of said finger to engage the adjacent underface of the panel. Upon sliding the base 13 forward to the position at which the shoulder 17 of said finger is in substantial engagement with a wall of the opening, the locking detent 16 is free to snap into the opening such that the extremity thereof is in position to engage the adjacent wall of said opening and prevent any movement of the attaching finger 15 in a direction toward disassembly or removal from said assembling opening. The locking detent 16 thus locks the clip in finally applied position, as shown in Fig. 1, with the attaching finger 15 cooperating with the base 13 of the clip in engaging opposite sides of the panel to maintain the socket 11 firmly and rigidly in secured relation thereon.

An important advantage in the provision of an attaching means of this character resides in the fact that the finger 15 may be made highly resilient and the lip 19 designed to adapt the same for engaging panel members of different thicknesses and otherwise compensate for burrs and other manufacturing variations in the thickness of a panel adjacent the assembling openings 2 therein. It is to be understood, however, that the specific form of attaching finger shown may be modified in various ways within the spirit and scope of the invention; also, the locking detent 16 need not necessarily engage in the same opening in the wall member as the attaching finger, but may be designed to be received in a separate recess therein to lock the clip in applied position in a manner equivalent to that shown and described.

The spaced feet 14 of the socket member 11 are adapted to compensate for any irregularities in the adjacent surface of the panel P and otherwise cooperate with the attaching base 13 to retain the clip firmly and rigidly in finally attached position on the panel. In this respect, the base 13 may be bent slightly at the junction of the base and socket member 11 to have a generally bowed relation to the panel P and thereby adapt said feet 14 for engaging the panel with increased resiliency and otherwise compensate for any irregularities in the panel surface adjacent the assembling opening to ensure a fixed, rigid attachment of the clip in finally applied position on said panel.

In the use of the supporting clips of the present invention in accordance with the foregoing, it will be understood that inasmuch as the split socket members 11 are resilient and readily expansible, the associated spacing posts or glass stands 5 may be readily forced therein to firmly and rigidly held position either before or after the clip is attached to the panel, the rib 12 sliding over the surfaces of the threads 6 incidental to the expansion of the socket member for this purpose. Thus, a spacing post or glass stand 5 may be inserted into the socket 11 to approximately the correct distance for supporting the tube T from the panel, and the spacing post then rotated on its axis such that said rib 12 serves to thread the shank thereof either outwardly or inwardly relative to the socket in order to obtain the correct adjustment of the head 7 of the spacing post from the base 13 of the clip and the panel. When the proper length of the spacing post relative to the socket member 11 is determined, the surplus portion thereof may be cut or broken off by a suitable tool applied thereto through the cutout areas of the socket 11 adjacent the feet 14. In breaking off the surplus portions of the posts to a suitable length, it is the common practice to adjust one post to the proper length and then break off the required number of posts to the same length. This is facilitated by the usually coarse threads 6 of the posts defining relatively deep grooves which permit the same to be cut easily and quickly at any required point.

As many supporting clips 10 as are necessary or desirable are attached to the panel P, in the manner aforesaid, through preperforated assembling openings 2 provided therein along the general path or contour which the tube T is to extend in mounted position. The spacing posts 5 are inserted in the socket members 11 of said clips and rotated axially as necessary to dispose the recessed heads 7 thereof in position for seating the tube, substantially as shown in Fig. 1, whereupon the tie wires 9 or similar means are looped to the ears 8 of the spacing posts to secure the tube in finally mounted position in the advertising sign or similar structure.

Referring to Fig. 4, it will be understood that with a clip attached to a generally round opening 2 in the panel, the socket 11 thereof is offset a considerable distance from the points of attachment of the attaching means 15, 16 in said opening, whereupon the socket may be rotated in such radius for any angular adjustment necessary to position the spacing post 5 supported thereby in line with curved or other irregular portions of the tube T. Since the spacing post 5 is rotatably held in the socket 11, the same may be rotated on its axis as necessary for the tube T to seat perfectly on the recessed head 7 thereof in various positions of adjustment, as shown in Fig. 1, preparatory to securing the same by tie wires 9 looped around the ears 8 of the spacing posts, as aforesaid.

In the event it becomes necessary to replace or repair a damaged part of the tubing T, disassembly of the complete sign is not required since the supporting clip of the present invention may be easily detached simply by applying a suitable pointed tool to the base 13 of the clip to wedge the same away from the panel sufficiently for the locking detent 16 to clear the adjacent wall of the assembling opening, whereupon the clip may be removed from the panel upon sliding of the base 13 thereof in the direction toward withdrawal of the attaching finger 15 from said assembling opening, substantially in a reversal of the procedure described for applying the clip to attached position.

Figs. 5 and 6 illustrate a further embodiment of the invention wherein the supporting clip is formed with a pair of base portions 13', 13'', provided with individual attaching means similar in function and use to the attaching means described with reference to Figs. 1–4 inclusive. Said base portions 13', 13'' are provided by partially severed sections integral with the blank forming the socket member 11 at the lower end thereof, and bent outwardly therefrom in generally normal relation thereto. The cooperating attaching finger and locking detent elements 15', 16' on base sections 13', and 15'', 16'' on base section 13'', respectively, are accordingly designed to be received in correspondingly spaced openings 3, 4 in the panel P', Fig. 6. Said openings 3, 4 may be either round or rectangular to receive the attaching fingers 15', 15'' at spaced points, substantially as previously described, to provide a fixed, rigid mounting of the socket member 11 on the panel in an arrangement which is highly desirable and advantageous in assemblies wherein the socket member 11 must carry a relatively heavy load or is subject to undue lateral thrust in a completed installation.

While the invention has been described in detail with specific examples, such examples are intended as illustrations only, since it will be apparent to those skilled in the art that other modifications in the construction, arrangement and general combination of parts thereof may be devised without departing from the spirit and scope of the invention. The present embodiments are therefore to be considered in all respects as illustrative, and not restrictive, the scope of the invention being indicated by the appended claims rather than by the foregoing description, with all changes falling within the scope, meaning and range of equivalency of the claims intended to be embraced therein.

What is claimed is:

1. A clip comprising a one-piece sheet metal body defining a generally tubular socket and an integral base projecting laterally from the socket for supporting said socket on an apertured panel or the like in generally perpendicular relation thereto, an attaching finger or the like extending in spaced relation to the undersurface of said base, said finger being receivable in said aperture and adapted to cooperate with said base of the clip in engaging opposite sides of said panel to retain the socket firmly and rigidly thereon in attached position, and a locking detent adapted to positively engage the panel to lock the attaching finger in said aperture in such attached position.

2. A clip comprising a one-piece sheet metal body defining a generally tubular socket and an integral base projecting laterally from the socket for supporting said socket on an apertured panel or the like in generally perpendicular relation thereto, an attaching finger or the like extending in spaced relation to the undersurface of said base and defining a shoulder adjacent thereto and a bearing portion spaced from said base a distance less than the thickness of the panel, and a locking detent projecting from the undersurface of said base defining a shoulder spaced from the shoulder of the attaching finger a distance slightly less than the size of said aperture, said finger being receivable in said aperture with said bearing portion adapted to cooperate with said base of the clip in engaging opposite sides of said panel to retain the socket firmly and rigidly thereon in attached position, and said locking detent being also receivable in said aperture and adapted to engage the wall thereof to lock the attaching finger in said aperture in such attached position of the clip.

3. A clip comprising a one-piece sheet metal body defining article holding means and spaced base portions extending laterally thereof for supporting said article holding means on an apertured panel or the like, each of said base portions having an attaching finger or the like extending in spaced relation to the undersurface thereof, said fingers being receivable in spaced apertures in the panel and adapted to cooperate with their associated base portions in engaging opposite sides of said panel to retain said article holding means firmly and rigidly thereon in attached position, and means provided on said base portions for locking said attaching fingers in such attached position in said apertures.

GEORGE A. TINNERMAN.